June 23, 1964 P. A. FLORIO 3,138,514
PLURAL PLY PADDING DISCONTINUOUSLY BONDED
AND METHOD OF MANUFACTURE
Filed June 20, 1960 2 Sheets-Sheet 1
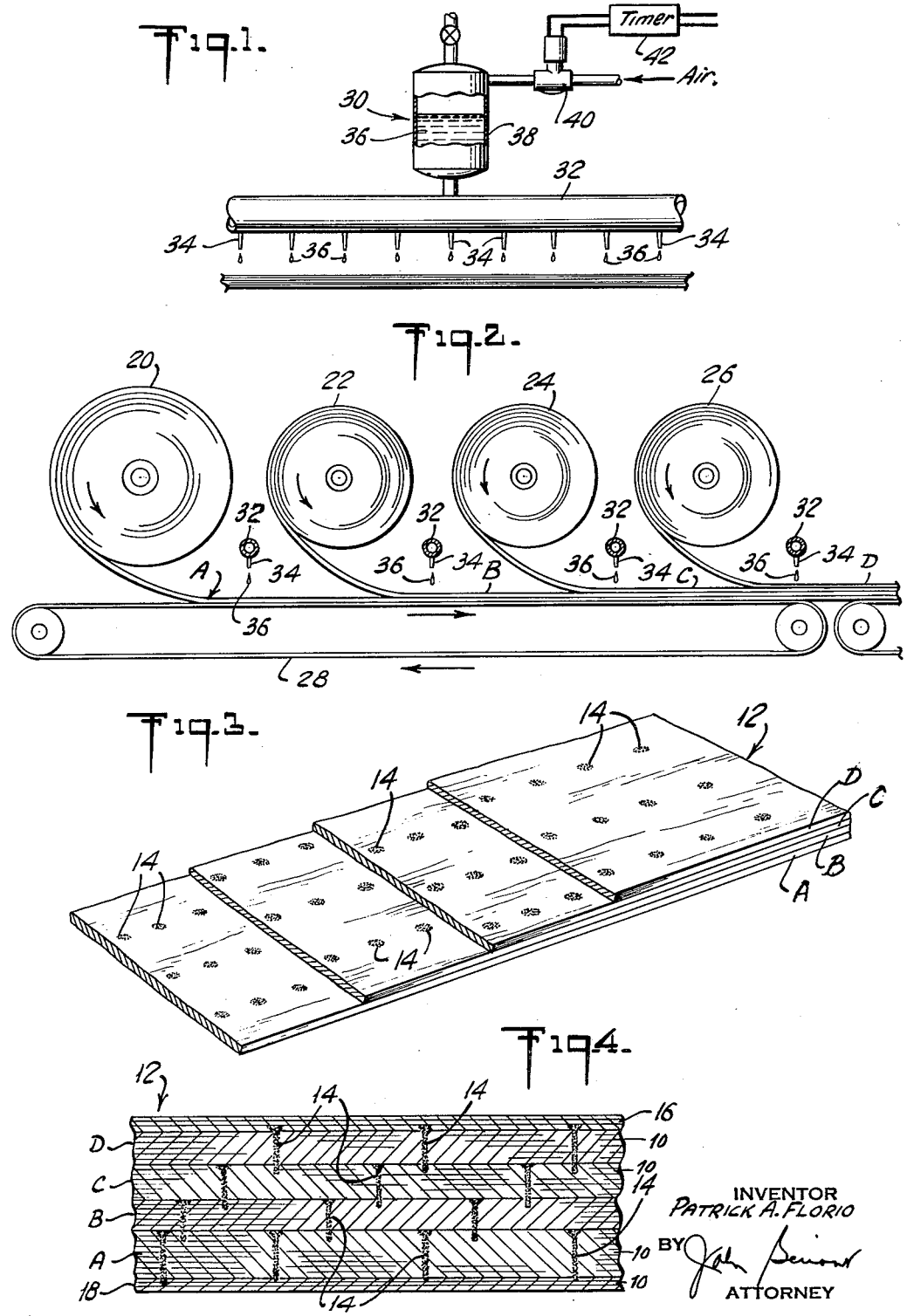

June 23, 1964  P. A. FLORIO  3,138,514
PLURAL PLY PADDING DISCONTINUOUSLY BONDED
AND METHOD OF MANUFACTURE
Filed June 20, 1960  2 Sheets-Sheet 2
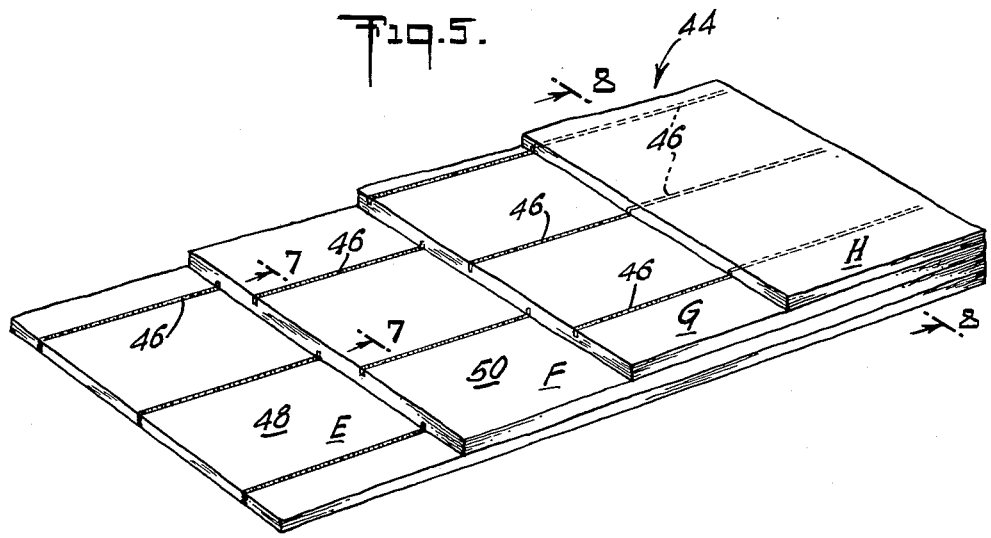
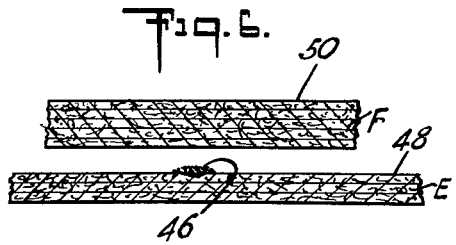
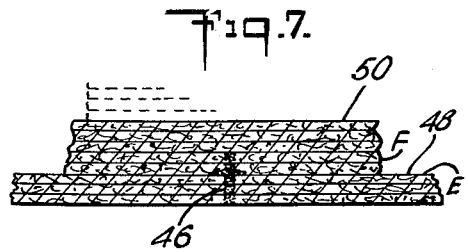
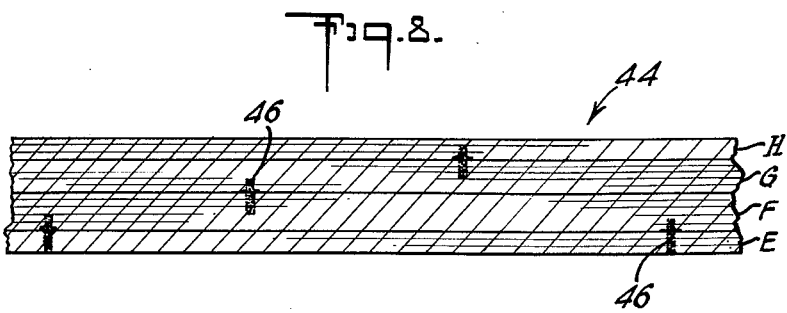
INVENTOR
PATRICK A. FLORIO
BY
ATTORNEY

United States Patent Office 3,138,514
Patented June 23, 1964

3,138,514
PLURAL PLY PADDING DISCONTINUOUSLY BONDED AND METHOD OF MANUFACTURE
Patrick A. Florio, Short Hills, N.J., assignor, by mesne assignments, to Johnson & Johnson, New Brunswick, N.J., a corporation of New Jersey
Filed June 20, 1960, Ser. No. 37,465
18 Claims. (Cl. 161—129)

This invention relates to multiple plies of superposed sheet material and more particularly concerns improvements in multi-ply padding or wadding formed of a plurality of plies of web material such as creped tissue paper or the like superposed and secured together to provide an integral pad or bat.

Wadding, padding and similar products containing a plurality of superposed plies of sheet material built up to a relatively large thickness and employed as a packing, padding or cushioning material because of its high bulk and low density have conventionally been made by superposing a plurality of plies of sheet material and joining the plies by stitching, needle puncturing operations, embossing, or by means of an adhesive.

Joining the plies of such products by mechanical operations, as by stitching, needle puncturing, or embossing, is usually accompanied by some compressing or compacting of the plies with a resultant loss in over-all bulk and thickness of the wadding. It is necessary, therefore, to use a greater number of superposed plies to obtain wadding of a given thickness. Adhesively securing the plies together has heretofore involved the separate application of adhesive to each ply, superposing the plies to join them together and repeating the operation with as many plies as required to provide wadding of the desired thickness. Since commercial wadding may contain from twenty to sixty or more superposed plies of tissue paper, this operation requires extended manufacturing facilities and results in higher costs. In addition, the product resulting from adhesively joining separate plies in this manner may contain excessive amounts of adhesive and be relatively stiff and inflexible, and of low bulk and loftiness.

It is preferable, from a manufacturing viewpoint, to superpose a large number of plies before joining them together to avoid the need for repeating the joining operation. However, in adhesively joining a plurality of superposed plies, penetration of all of the plies with the adhesive has heretofore been difficult and usually requires the use of mechanical devices to effect penetration of all plies so that they will be joined together.

The product of the present invention contains a plurality of superposed plies of sheet material, such as fibrous webs or layers, which are joined or associated with each other by bonding the plies in spaced zones or areas. The product is so arranged and constructed that a group of superposed plies of sheet material are bonded to each other by an adhesive in spaced areas to form a series of plies while other groups of superposed plies are bonded to each other in spaced areas to form other series of plies. The respective series of plies so formed are positioned in superposed relationship with the areas of bonding in one series being offset or staggered from the areas of bonding in an adjacent series, with portions of the adhesive material in one series of plies also bonding one or more of the adjacent plies in an adjacent series. The product of the invention thus contains a number of superposed series of superposed plies of sheet material, the plies of each series being adhesively bonded together in spaced areas, with the plies in one series being bonded to the adjacent plies of an adjacent series.

In accordance with this invention, bats or wadding of any desired thickness may be obtained by forming a series of plies of sheet material, e.g., six to ten plies, applying a liquid bonding material in spaced zones or areas to the surface of the top ply of the series in sufficient amounts to penetrate through the plies of the series to bond them together, placing a second series of superposed plies on top of the first series, applying the liquid bonding material in spaced zones or areas to the top surface of the top ply of the second series of plies in sufficient amounts to penetrate the plies in the second series plus one or more of the adjacent outer plies of the first series lying below. The bonding material which joins the plies of a series of plies also joins it and an adjacent series together. The process can be repeated by placing a number of series of plies on top of other series of plies joined in the above described manner.

Reference is made to the accompanying drawings and the following description wherein a preferred embodiment of the invention is illustrated and described by way of example:

FIG. 1 is a schematic view of devices which may be used to apply adhesive in spaced areas to a plurality of superposed plies of sheet material to join them together;

FIG. 2 is a schematic side edge view of a number of rolls of sheet material, each roll providing a series of superposed plies, the series of plies from each roll being associated to form the product of the invention, and of the devices of FIG. 1 for applying adhesive to each of the series of plies;

FIG. 3 is a perspective view of wadding of creped tissue paper embodying the invention and illustrating a suitable pattern for bonding the series of plies and the plies in each series in spaced zones or areas;

FIG. 4 is an enlarged vertical sectional view of wadding of FIG. 3 illustrating the manner in which the plies in each series of plies are joined to each other and also the manner in which one series of plies is joined to an adjacent series;

FIG. 5 is a perspective view of another form of the invention;

FIG. 6 is a fragmentary view in section illustrating the early stages of associating series of plies to provide the product of FIG. 5;

FIG. 7 is a later stage of associating the plies; and
FIG. 8 is a view of FIG. 5 taken along lines 8—8.

Referring to FIGS. 3 and 4 of the drawings, a product incorporating the invention may include a plurality of superposed sheets 10 of thin, creped tissue paper containing, by way of example, primarily sulphate kraft and reclaimed fibers from kraft cuttings prepared in a conventional and well-known manner on a commercial tissue machine. A suitable tissue of this form has a base weight of 13½ lbs. per ream of 2880 sq. ft. on a bone dry basis. By way of example, thirty-three sheets of such material may be superposed to form a thick, lofty wadding 12. The wadding in the embodiment illustrated may be considered as being divided into four superposed series A, B, C and D of superposed plies 10, series B, C and D containing 8 plies of tissue paper and series A containing 9 plies. The plies in each series are joined together in spaced areas 14 which are of relatively small size with the areas of bonding in any single series being in substantial vertical alignment through the plies of the series. Each series of plies is so positioned in superposed relationship with respect to an adjacent series of plies that the areas of bonding in one series of plies preferably are in offset or staggered relationship to the areas of bonding of the adjacent series of plies, as it is more readily understood from an examination of FIG. 4.

The series of plies are joined to each other by adhesively bonding one or more of the outer plies of one series to the adjacent plies of an adjacent series. In this manner any number of series of plies may be joined to each other. This method of joining the plies provides the following advantages, among others; it eliminates the necessity of applying adhesive to individual plies and then superposing the individual plies; it overcomes the difficulty, if not the impracticality, of trying to adhesively join a relatively large number of plies simultaneously; and, it provides a more flexible product than would be obtained by having all plies adhesively bonded in spaced areas all of which are in substantial alignment with each other vertically through the wadding. In the latter instance, the areas of bonding form hard stiff spots upon drying which extend through the thickness of the wadding, thereby reducing its flexibility and making rolling of the wadding difficult.

As a practical matter, the number of plies used to form each series of plies may be determined to some extent on the basis of the speed with which the adhesive applied to the top ply of a series penetrates through the plies. If too large a number of plies are used, the time required for the adhesive to penetrate the plies will be long; if too small a number of plies are used, the economies of manufacturing will be affected. By appropriate selection of the number of plies used to form a series, the type of adhesive used, its viscosity and the like, optimum manufacturing procedures can be established.

The amount and viscosity of the adhesive which is applied in the spaced areas to the various series of plies is so regulated as to obtain the desired penetration of the plies in the series plus some of the plies in an adjacent series, where required. The adhesive is preferably applied to the various series of plies in the form of drops or thin lines to limit the extent of application. Various adhesives or bonding agents may be used including a water solution of borated starch, plasticized polyvinyl acetate and hot melts, suitably adjusted with respect to the amounts applied and their viscosity considered in connection with the physical characteristics of the plies being joined with regard to permeability, thickness, and the number of plies being joined in any single series.

The pattern in which the adhesive is applied to the various series of plies may be varied, as may be the spacings between the areas of application of the adhesive. The pattern of spaced areas of zones 14 illustrated in FIGS. 3 and 4 of the drawings has been found particularly suitable, although adhesive zones or areas of other forms and arranged in other patterns may be used. The area of bonding and the extent of bonding is desirably minimized consistent with providing a product which has the characteristics necessary for its intended use. A wadding formed of thirty-three plies of creped sulphate kraft tissue paper having a bone dry base weight of 13½ lbs. per ream can be suitably bonded by applying sufficient liquid borated starch adhesive to penetrate the plies of each series as described above in areas which are spaced two inches from each other to form rows of spaced adhesive areas extending transversely of the plies with adjacent rows of adhesive areas being spaced two inches from each other.

In some instances, depending upon the nature of the bonding material used and upon the characteristics of the sheet material, such as its permeability, some of the adhesive bonding one series of plies may also bond one or more of the adjacent plies of an adjacent series of plies placed on top of it. The adhesive will be drawn up into the adjacent series of plies on top by capillarity or a wicking action, thus joining the series of plies together. In addition, complete penetration of the adhesive through the plies does not necessarily have to occur immediately during manufacture, particularly if the wadding is rolled up for storage after it is made. Partial initial penetration of some of the plies may occur at the time the adhesive is applied and final penetration may take place by capillarity or wicking during storage.

In the preferred form of the invention and particularly when the wadding is to be rolled up during storage, an upper series 16 and a lower series 18 of plies, which are joined together by dry embossing, are placed on the top and bottom of the adhesively joined series of plies A, B, C and D to act as a barrier to the adhesive to prevent it from penetrating to the outside of the wadding so that the wadding can be unrolled for use without sticking. A product incorporating this feature of the invention may be made by placing a roll which supplies the three ply series 18 before roll 20 in the manufacturing line, the plies of series 18 being bonded together by fine, spaced lines of embossing instead of by an adhesive. The series A of the plies obtained from roll 20 is then positioned on top of the series 18 of embossed plies and sufficient adhesive deposited on the series A of plies to penetrate the plies of the series, plus one or more but not all, of the plies of the dry embossed series 18. A similar series 16 of dry embossed plies may also be placed on top of the last series of plies used to form the wadding, thus preventing the adhesive from penetrating through the top outer plies of the completed wadding.

A method and apparatus for making a product embodying the invention is illustrated in FIGS. 1 and 2. Supply rolls of creped tissue paper, 20, 22, 24 and 26, each roll containing a number of plies of paper superposed to form a series of plies, are arranged with their longitudinal axis in spaced alignment so that each series of plies from each roll may be fed to an endless belt 28 moving below. Series A from roll 20 has, by way of example, nine plies of tissue paper, and the series from rolls 22, 24 and 26 each have eight plies.

The series A of plies from roll 20 is fed from the roll to the surface of the endless belt moving below. An adhesive applicator device 30, which includes an elongated hollow tube 32 closed at both ends and extending transversely of and above the series of plies lying on the endless belt which is adjacent to the roll in longitudinal alignment therewith is used to apply adhesive to the top ply of the series A of plies. The elongated tube is formed with a plurality of spaced ports or orifices 34 on the bottom side through which a liquid adhesive 36, such as a water solution of a borated starch containing 40% active solids, 60% $H_2O$, and having a viscosity of 150 centipoises at 700° F. is fed from a source of supply or reservoir 38 into the elongated tube. Compressed air is fed into the supply tank of adhesive through a solenoid valve 40 actuated by a timer device 42 which opens the valve at pre-established intervals and under sufficient pressure to permit the compresesd air to enter the supply tank causing the adhesive in the elongated tube to be ejected through the ports in the form of drops to the top surface of the web of the series of plies positioned directly below. As the series A of plies moves below the elongated tube containing adhesive, drops of adhesive are ejected from the tube and deposited on the surface of the top ply of the series by actuating the timer device. There is thus placed on the top ply of the series A of plies spaced drops of adhesive extending transversely of the ply and arranged in rows. After the adhesive is applied to the top ply of the series, it penetrates through the plies of the series, adhesively bonding the plies of the series together.

After the series A of plies has had adhesive applied to it, it is conveyed beneath roll 22 whereupon series B of plies is placed upon the series A of plies. After series B of plies has been positioned upon series A, adhesive is deposited in spaced areas on the top ply of series B of plies by an adhesive applying device like that used to apply adhesive to series A. Sufficient adhesive is applied to the top ply of series B of plies so that the adhesive penetrates the plies in the series B and at least one or more of the top plies of the series A of plies lying directly below. In this manner, all plies in series B of plies are adhesively united to each other and the series A of plies is adhesively united to the series B of plies.

The operation is then repeated with other series of plies, as desired, provided by rolls 24 and 26.

Each adhesive applying device used to deposit adhesive on each series of plies is so regulated, by appropriately adjusting the timer device, that adhesive is applied to the series of plies in areas offset or staggered from the areas to which adhesive had been applied to the series adjacent and below. In this manner, the adhesive areas of one series of plies are out of vertical registry with the adhesive areas of an adjacent series of plies. This eliminates the formation of adhesive areas which extend completely through the wadding which creates hard points or spikes. Where multiple series of plies are used, the areas of adhesive of one series of plies may be in register with another series providing the two series are not adjacent to each other.

In FIGS. 5–8, there is illustrated another embodiment of the invention wherein the respective series of plies are adhesively bonded together by spaced lines of adhesive instead of by the spot bonding employed in the previous embodiment. In this form, the multi-ply wadding 44 includes, by way of example, four groups or series of plies, E, F, G and H, each series of plies containing a plurality of plies. The bottom series E may contain 3 plies, the intermediate series F and G 5 plies and the top series H also contains 3 plies.

To form the product of FIG. 5, the series of plies E consisting of 3 plies is laid down on a belt in a manner like that in the embodiment described above. Thin lines of adhesive 46 are then applied in spaced relationship to the top surface 48 of the top ply of the series with apparatus similar to that of FIGS. 1 and 2, suitably modified, so that thin, continuous streams of adhesive are ejected from orifices 34. The amount and viscosity of the adhesive applied is desirably regulated to penetrate the top two plies of the series E and to just contact the bottom or third ply of the series without penetrating through. The second series of plies F consisting of 5 plies is then placed on the top surface 48 of series E, e.g., the surface to which adhesive has been applied, directly after the adhesive has been applied and before the adhesive has completely penetrated downwardly into the plies of series E. By timely positioning series F upon series E, the bottom plies of series F contact the adhesive applied to the top of series E while there is still some adhesive on the top surface, whereupon the adhesive will penetrate upwardly into the bottom plies of series F by a wicking action or capillarity. In this manner, the bottom plies of series F will become adhesively secured to series E, as illustrated in FIG. 7. Adhesive is next applied to the top surface 50 of the top ply of series F along lines out of alignment with the lines of adhesive in series E and the series of plies G then placed upon the top surface of series F directly thereafter so that some of the adhesive applied to the top surface of series F will penetrate upwardly into the bottom plies of series G, thereby securing those plies to series F. This process may be repeated as many times as desired.

When a bat of approximately the desired thickness has been formed in this manner, a series of 3 plies, series H, is placed upon the top of the last series of 5 plies. No adhesive is applied to the top surface of series H. Instead, bonding of series H to the other series of plies forming the wadding is obtained by the upward penetration into the plies of series H of adhesive applied to the top surface of the last series of plies applied, e.g., series G.

The amount, viscosity of the liquid adhesive used, and the rate of joining the series of plies together are regulated and adjusted to obtain both the desired downward penetration of adhesive into the series of plies to which the adhesive is applied, and the upward penetration into the bottom plies of the series of plies placed thereon. In the above example, the aforementioned factors may be regulated to obtain a downward penetration of the adhesive into three plies of a bottom intermediate series of plies and an upward penetration of the adhesive through the bottom two plies and to just contact the third ply of the series placed thereon, thereby securing adjacent series of plies to each other.

It is to be noted that in this embodiment, the plies in each series of plies as they are laid down are not necessarily all bonded together along the same vertical line within the series of which they initially form a part. Instead, the top plies of the series may be bonded along a vertical line, and the bottom ply or plies of the same series bonded along the same line to the top plies above and also to the top plies of the series directly below, but along a different vertical line. In effect, the bottom ply or plies, while initially a part of one series of plies when the series is laid down, becomes part of an adjacent series due to the manner of bonding.

The lines of adhesive applied to the series of plies are thus, in general, so disposed that the lines of adhesive in one series of plies are offset or staggered from the lines of adhesive in adjacent series of plies. Other forms of adhesive patterns, e.g., wavy, zig-zag, broken, etc., may be suitably employed.

The product formed in accordance with this invention has a bulk and loftiness which is essentially the same as that of the superposed plies prior to joining them together. The product is well integrated and retains its integrated form under the conditions of use normally intended. It is flexible, can be rolled readily, and can be molded easily into conforming engagement with the surfaces against which it is placed.

It is to be understood that the foregoing embodiments of the invention are illustrative thereof and are not to be construed in a limited sense. For example, the web material used in forming the product of the invention may be thick or thin, may be made from various material, including woven and non-woven fabrics of different fibers. It is apparent, therefore, that numerous variations and substitutions and changes may be made without departing from the spirit of the invention.

This applicaiton is a continuation-in-part of my copending application Serial No. 779,318, "Pad Material," filed December 10, 1958, now abandoned.

What is claimed is:

1. A bat of fibrous web material comprising a plurality of superposed plies of said material, said plies being arranged to form a number of superposed series of plies each containing a plurality of plies, the plies in each of said series being adhesively bonded together in spaced areas extending in aligned relation through said series, the spaced areas of bonding in adjacent series of plies being out of alignment, adjacent series of plies being bonded together in areas in registry with areas in which plies in one of said adjacent series of plies are bonded together, a plurality of the plies in a series of plies being unbonded to an adjacent series of plies.

2. A bat in accordance with claim 1 wherein said spaced areas are spaced lines.

3. A bat in accordance with claim 1 wherein said spaced areas are spaced spots.

4. A bat in accordance with claim 1 wherein said bat has an outer ply mechanically joined thereto.

5. A bat in accordance with claim 1 wherein said bat has an outer ply mechanically joined thereto by embossing.

6. A bat in accordance with claim 1 wherein adjacent plies of adjacent series of plies are bonded together in areas in registry with the areas of bonding in each of said adjacent series of plies.

7. A bat in accordance with claim 1 wherein said fibrous web material is creped paper.

8. A bat of fibrous web material comprising a plurality of superposed plies of said material, said plies being arranged to form a number of superposed series of plies each containing a plurality of plies, the plies in each of said series being adhesively bonded together in spaced areas extending in aligned relation through said series, the spaced areas of bonding in adjacent series of plies being out of alignment, at least one ply of a series of plies being bonded to an adjacent series of plies in areas in registry with areas in which plies in one of said series of plies are bonded together, a plurality of the plies in a series of plies being unbonded to an adjacent series of plies.

9. A bat of fibrous web material comprising a plurality of superposed plies of said material, said plies being arranged to form a number of superposed series of plies each containing a plurality of plies, the plies in each of said series being adhesively bonded together in spaced areas extending in aligned relation through said series, the spaced areas of bonding in adjacent series of plies being out of alignment, adjacent plies of adjacent series of plies being bonded together in areas in registry with areas in which plies in one of said adjacent series of plies are bonded together, a plurality of the plies in a series of plies being unbonded to an adjacent series of plies.

10. The method of making a thick, unitary bat of superposed plies of fibrous web material which includes bonding a series of superposed plies of said material in spaced areas extending in aligned relation through said plies, positioning another series of superposed plies of said material in superposed relationship with said bonded series of plies, bonding said positioned series of plies in spaced areas extending in aligned relation through said plies, said areas being out of alignment with the areas of bonding in said first bonded series of plies, the amounts of said bonding material applied being sufficient to bond said plies and said series of plies together to form an integral structure.

11. The method of making a thick, unitary bat of superposed plies of fibrous web material by bonding a plurality of plies of said material which includes applying a liquid bonding material in spaced areas to a surface of each of a plurality of a series of superposed plies of said material, positioning said plurality of series of superposed plies in superposed relationship with respect to each other while said bonding material is still liquid and with the said spaced areas of adjacent series of plies being out of alignment, the amounts of adhesive applied being sufficient to penetrate plies in said series and also to bond said plies and said series of plies together to form an integral structure.

12. The method of making a thick, unitary bat of superposed plies of fibrous web material by bonding a plurality of plies of said material which includes applying a liquid bonding material in spaced areas to an outer surface of a series of superposed plies of said material, positioning a second series of superposed plies of said material in superposed relationship with said series of plies while said bonding material is still liquid, applying a liquid bonding material in spaced areas to the exposed surface of said second series of superposed plies, the amounts of said bonding material applied being sufficient to penetrate and bond said plies and said series of plies together to form an integral structure, the areas of bonding of said second series of superposed plies being out of alignment with the areas of bonding of the first series of plies.

13. The method of making a thick, unitary bat of superposed plies of fibrous web material by bonding a plurality of plies of said material which includes applying a liquid adhesive in spaced spots to an outer surface of a series of superposed plies of said material, positioning a second series of superposed plies of said material on said outer surface of said first series of plies while said adhesive is still liquid, applying a liquid adhesive in spaced spots to the exposed surface of said second series of superposed plies, the amounts of said adhesive applied being sufficient to penetrate and bond said plies and said series of plies together to form an integral structure, the areas of bonding of said second series of superposed plies being out of alignment with the areas of bonding of the first series of plies.

14. The method of making a thick, unitary bat of superposed plies of fibrous web material by bonding a plurality of plies of said material which includes applying a liquid adhesive in spaced lines to an outer surface of a series of superposed plies of said material, positioning a second series of superposed plies of said material on said outer surface of said first series of plies while said adhesive is still liquid, applying a liquid adhesive in spaced lines to the exposed surface of said second series of superposed plies, the amounts of said adhesive applied being sufficient to penetrate and bond said plies and said series of plies together to form an integral structure, the lines of bonding of said second series of superposed plies being out of alignment with the lines of bonding of the first series of plies.

15. The method of making a thick, unitary bat of superposed plies of fibrous web material by bonding a plurality of plies of said material which includes applying a liquid bonding material in spaced areas to an outer surface of a series of superposed plies of said material, positioning other series of superposed plies of said material individually in superposed relationship to said first series of plies while said bondng material is still liquid, applying a liquid bonding material in spaced areas to the exposed surface of each of said other series of plies before positioning the next series of plies thereon, said next series of plies being positioned while said bonding material is still liquid, the amounts of said bonding material applied being sufficient to penetrate and bond said plies and said series of plies together to form an integral structure, the areas of bonding of adjacent series of superposed plies being out of alignment.

16. The method of making a thick, unitary bat of superposed plies of fibrous web material by bonding a plurality of plies of said material which includes applying a liquid bonding material in spaced areas to an outer surface of a series of superposed plies of said material, positioning other series of superposed plies of said material individually in superposed relationship to the first series of plies while said bonding material is still liquid, applying a liquid bonding material in spaced areas to the exposed surface of each of said other series of plies before positioning the next series of plies thereon, the areas to which said bonding material is applied to adjacent series of plies being offset from each other, the amounts of said bonding material applied being sufficient to penetrate and bond said plies and said series of plies together to form an integral structure.

17. The method of making a thick, unitary bat of superposed plies of fibrous web material by bonding a plurality of plies of said material which includes applying a liquid bonding material in spaced areas to an outer surface of a first series of superposed plies of said material, positioning a second series of superposed plies of said material on said outer surface of said first series of plies while said bonding material is still liquid, applying said liquid bonding material to the outer surface of said second series of plies in spaced areas out of alignment with said areas in said first series of plies, the viscosity and amount of said liquid bonding material applied to said second series being sufficient to enable said bonding material to penetrate a number of plies in said second series, and to said first series sufficient to enable said bonding material applied to said first series of plies to penetrate a ply of said second series to bond said first and second series together.

18. The method of making a thick, unitary bat of superposed plies of fibrous web material by bonding a plurality of plies of said material which includes positioning a first series of superposed plies of said material upon a second series of superposed plies, applying a liquid bonding material in spaced areas to the other surface of said first series of plies, positioning a third series of superposed plies of said material on the outer surface of said first series of plies while said bonding material is still liquid, applying a liquid bonding material in spaced areas to the outer surface of said third series of plies in spaced areas out of alignment with said areas in said first series of plies, the viscosity and amount of said liquid bonding material applied to said first series being sufficient to enable said bonding material to penetrate the plies in said first series of plies and also to penetrate a ply in each of said second and third series of plies to bond all series of plies together.

References Cited in the file of this patent

UNITED STATES PATENTS

| | | |
|---|---|---|
| 1,201,701 | Crane | Oct. 17, 1916 |
| 1,847,269 | Schur | Mar. 1, 1932 |
| 1,898,601 | Shoemaker | Feb. 21, 1933 |
| 1,992,215 | Kellett | Feb. 26, 1935 |
| 2,039,312 | Goldman | May 5, 1936 |
| 2,142,463 | Upson | Jan. 3, 1939 |
| 2,509,494 | Gruenwald | Mar. 30, 1950 |
| 2,698,574 | Doughertz et al. | Jan. 4, 1955 |
| 2,880,111 | Drelich et al. | Mar. 31, 1959 |
| 3,047,445 | Gresham | July 31, 1962 |